(12) United States Patent
Miyawaki et al.

(10) Patent No.: US 7,346,924 B2
(45) Date of Patent: Mar. 18, 2008

(54) STORAGE AREA NETWORK SYSTEM USING INTERNET PROTOCOL, SECURITY SYSTEM, SECURITY MANAGEMENT PROGRAM AND STORAGE DEVICE

(75) Inventors: Toui Miyawaki, Yokohama (JP); Takeshi Ishizaki, Yokohama (JP); Emiko Kobayashi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 10/852,400

(22) Filed: May 25, 2004

(65) Prior Publication Data
US 2005/0210291 A1 Sep. 22, 2005

(30) Foreign Application Priority Data
Mar. 22, 2004 (JP) ............... 2004-082202

(51) Int. Cl.
*H04L 9/00* (2006.01)
(52) U.S. Cl. ............... 726/6; 726/13; 726/11; 726/3; 726/2; 713/150
(58) Field of Classification Search ........... 726/11, 726/3, 2; 713/150
See application file for complete search history.

(56) References Cited

U.S. PATENT DOCUMENTS

| | | | | |
|---|---|---|---|---|
| 5,983,270 | A * | 11/1999 | Abraham et al. | 709/224 |
| 6,775,657 | B1 * | 8/2004 | Baker | 706/45 |
| 6,834,299 | B1 * | 12/2004 | Hamilton et al. | 709/220 |
| 6,895,461 | B1 | 5/2005 | Thompson | 710/305 |
| 7,093,283 | B1 * | 8/2006 | Chen et al. | 726/6 |
| 2002/0157020 | A1 * | 10/2002 | Royer | 713/201 |
| 2003/0105830 | A1 | 6/2003 | Pham et al. | 709/216 |
| 2003/0115447 | A1 | 6/2003 | Pham et al. | 713/153 |
| 2003/0177396 | A1 * | 9/2003 | Bartlett et al. | 713/201 |
| 2004/0165588 | A1 | 8/2004 | Pandya | 370/389 |
| 2004/0193943 | A1 * | 9/2004 | Angelino et al. | 714/4 |
| 2004/0215749 | A1 * | 10/2004 | Tsao | 709/220 |
| 2005/0021863 | A1 * | 1/2005 | Jungck | 709/246 |
| 2005/0022024 | A1 | 1/2005 | Hashimoto | 713/201 |
| 2005/0120222 | A1 | 6/2005 | Mitsuoka et al. | 713/182 |

FOREIGN PATENT DOCUMENTS

JP 2002-063063 2/2002

* cited by examiner

*Primary Examiner*—Ayaz Sheikh
*Assistant Examiner*—Saoussen Besrour
(74) *Attorney, Agent, or Firm*—Mattingly, Stanger, Malur & Brundidge, P.C.

(57) ABSTRACT

In order to remove security vulnerability in an IP-SAN and eliminate unauthorized access by spoofing, firewalls are installed in valid user servers and storage devices, and a distributed firewall manager for managing the firewalls integrally is provided in the IP-SAN. The distributed firewall manager obtains discovery domain information from an iSNS server, determines nodes registered in the iSNS server as the nodes of valid users, and autocreates a security policy according to sets consisting of an iSCSI name and portal information. This security policy is distributed to all of the firewalls as a common policy, whereupon access control is executed to deny TCP connection requests from unauthorized access sources.

9 Claims, 10 Drawing Sheets

FIG.4

| DISCOVERY DOMAIN | iSCSI NAME | PORTAL INFORMATION |
|---|---|---|
| DD1 | Ia | Pa |
| DD2 | Ib | Pb |

FIG.5

| iSNS SERVER REGISTRATION CONDITION | DISCOVERY DOMAIN | iSCSI NAME | PORTAL INFORMATION | SECURITY POLICY |
|---|---|---|---|---|
| REGISTERED | DD1 | Ia | Pa | ACCESS PERMITTED |
| REGISTERED | DD2 | Ib | Pb | ACCESS PERMITTED |
| UNREGISTERED | — | NEITHER Ia NOR Ib | NEITHER Pa NOR Pb | ACCESS DENIED |

FIG.7

| NOTIFICATION SOURCE | NOTIFICATION DESTINATION | DETECTION CONTENT | NOTIFICATION ITEMS |
|---|---|---|---|
| FIREWALLS | DISTRIBUTED FIREWALL MANAGER | DETECTION OF CONNECTION REQUEST FROM UNAUTHORIZED CONNECTION SOURCE INFORMATION | · MANAGEMENT INFORMATION CLASSIFICATION (UNAUTHORIZED ACCESS)<br>· UNAUTHORIZED CONNECTION SOURCE INFORMATION<br>· OBJECT TO ATTACK (INITIATOR OR TARGET INFORMATION)<br>· FIREWALL ID OF ATTACKED FIREWALL |
| | | SHUTDOWN REQUEST TO FIREWALL | · FIREWALL ID |
| | ADMINISTRATOR | CONTACT CANNOT BE MADE WITH FIREWALLS | · MANAGEMENT INFORMATION CLASSIFICATION (COMMUNICATION FAILURE)<br>· FIREWALL ID OF FIREWALLS THAT CANNOT BE CONTACTED |
| | | RECEPTION OF DETECTION OF CONNECTION REQUEST FROM UNAUTHORIZED CONNECTION SOURCE INFORMATION | · MANAGEMENT INFORMATION CLASSIFICATION (UNAUTHORIZED ACCESS)<br>· UNAUTHORIZED CONNECTION SOURCE INFORMATION<br>· OBJECT TO ATTACK (INITIATOR OR TARGET INFORMATION)<br>· NUMBER OF REPEATED ATTACKS FROM SAME CONNECTION SOURCE INFORMATION<br>· FIREWALL ID OF ATTACKED FIREWALL |
| DISTRIBUTED FIREWALL MANAGER | | DISCOVERY DOMAIN INFORMATION CANNOT BE OBTAINED FROM iSNS SERVER | · MANAGEMENT INFORMATION CLASSIFICATION (FAILURE TO OBTAIN DISCOVERY DOMAIN INFORMATION)<br>· iSNS SERVER INFORMATION (IP ADDRESS, PORT NUMBER, ETC.) |
| | MANAGER OF DISTRIBUTED FIREWALL MANAGERS | CONTACT CANNOT BE MADE WITH MANAGER OF DISTRIBUTED FIREWALL MANAGERS | · MANAGEMENT INFORMATION CLASSIFICATION (COMMUNICATION FAILURE)<br>· FIREWALL ID OF DISTRIBUTED FIREWALL MANAGERS THAT CANNOT BE CONTACTED |

FIG.11

| FIREWALL ID | DISCOVERY DOMAIN | SECURITY POLICY |
|---|---|---|
| FW-ID1 | DD1 | ACCESS DENIED TO ALL SETS APART FROM: SET OF Ia, Pa, AND FW-ID1, SET OF Ib, Pb, AND FW-ID5, SET OF IP1 AND ID3, AND SET OF IP2 AND IP4. |
| FW-ID2 | DD2 | ACCESS DENIED TO ALL SETS APART FROM: SET OF Ib, Pb, AND FW-ID5, SET OF Ic, Pc, AND FW-ID2, SET OF IP1 AND ID3, AND SET OF IP2 AND IP4. |
| FW-ID3 | — | ACCESS DENIED TO ALL SETS APART FROM: SET OF Ia, Pa, AND FW-ID1, SET OF Ib, Pb, AND FW-ID5, SET OF Ic, Pc, AND FW-ID2, SET OF IP1 AND ID3, AND SET OF IP2 AND IP4. |
| FW-ID4 | — | AS ABOVE |
| FW-ID5 | DD1, DD2 | AS ABOVE |

# STORAGE AREA NETWORK SYSTEM USING INTERNET PROTOCOL, SECURITY SYSTEM, SECURITY MANAGEMENT PROGRAM AND STORAGE DEVICE

CROSS-REFERENCES TO RELATED APPLICATIONS

This application relates to and claims priority from Japanese Patent Application No. 2004-082202, filed on Mar. 22, 2004, the entire disclosure of which is incorporated herein by reference.

BACKGROUND OF THE INVENTION

The present invention relates to security management in a storage area network using the Internet Protocol (to be referred to as IP-SAN hereinafter).

In a fiber channel network, security management is realized for practical use by means of masking using a logical unit number (to be referred to as LUN hereinafter). The reason for this is that, since a fiber channel network is provided on a much smaller scale than an IP network and is predominantly used as a closed network, threats to security through attack have not arisen thereon. However, in a Small Computer System Interface (to be referred to as SCSI hereinafter), which is the basic technology of a fiber channel network, the transmission distances are extremely short and environment construction costs are high; and, hence, in terms of maintenance and extendability, SCSIs are ill-suited to the ever-increasing scale of recent IT enterprises.

Thus, the need for IP-SANs using low-cost, highly extendable IP network technology continues to grow. Conventionally, a storage device that is installed on a closed network is accessed via an IP network, thus merging with business traffic, such that the network is expanded in scale. In so doing, however, the threat of intentional attack and the possibility of accidents caused by inadvertent traffic inflow increase.

Japanese Unexamined Patent Application Publication 2002-63063 discloses security technology in a SAN. In this technology, a conventional, divided security system is unitarily integrated and managed. To perform optimal security management automatically in the SAN, an integral management mechanism which controls the SAN integrally is installed, and this management mechanism is used to enable integral management of the access relations between hosts and storage devices.

In conventional LUN masking technology, security vulnerability exists in the phase up to LU access. More specifically, even when unauthorized LU access can be prevented, the establishment of a TCP (Transmission Control Protocol) connection may be permitted, leading to damage, such as a Denial of Service attack or a Distributed Denial of Service attack. Further, in the interior of an IP-SAN, an attacker may spoof connection source information to assume the identity of a valid user, and thus detect a list of other nodes (initiators or targets), and by assuming the identity of the detected other nodes, the attacker may detect nodes in an even wider range, thus enabling the attacker to gather information such as an iSCSI name, portal information, and discovery domain, which may be used as attack materials, easily and cumulatively.

SUMMARY OF THE INVENTION

In an Internet SCSI (to be referred to as iSCSI hereinafter), which is the basic technology of an IP-SAN, iSCSI names, which are unique node names, portal information, which is a set comprising an IP address and a port number, and so on are allocated to the nodes (initiators or targets) which serve as access units. In an IP-SAN, the iSCSI names, portal information, and so on are managed integrally, and, hence, a name server exists for providing a naming service and managing the access range in groups known as discovery domains.

The present invention is directed to a security system in a storage area network using the Internet Protocol, according to which access control is performed by obtaining discovery domain information managed by a name server and using this information as valid user information to autocreate a security policy. The system is constituted by firewalls for performing access control and a manager (to be referred to as a distributed firewall manager hereinafter) for managing the firewalls integrally, and they may be disposed in any location in the interior of an IP-SAN.

According to the present invention, a TCP connection request for unauthorized access can be denied in a storage area network using the Internet Protocol (IP-SAN).

Moreover, a security policy can be autocreated on the basis of discovery domain information.

BRIEF DESCRIPTION OF THE DRAWINGS

FIG. 4 is a diagram showing an example of discovery domain information;

FIG. 5 is a diagram showing an example of a security policy autocreated by a distributed firewall manager on the basis of the discovery domain information;

FIG. 7 is a diagram showing an example of management information notification between the distributed firewall manager and each firewall;

FIG. 11 is a diagram showing security policy definitions for each firewall ID in the second embodiment of the present invention.

DESCRIPTION OF THE PREFERRED EMBODIMENTS

Figure 2:
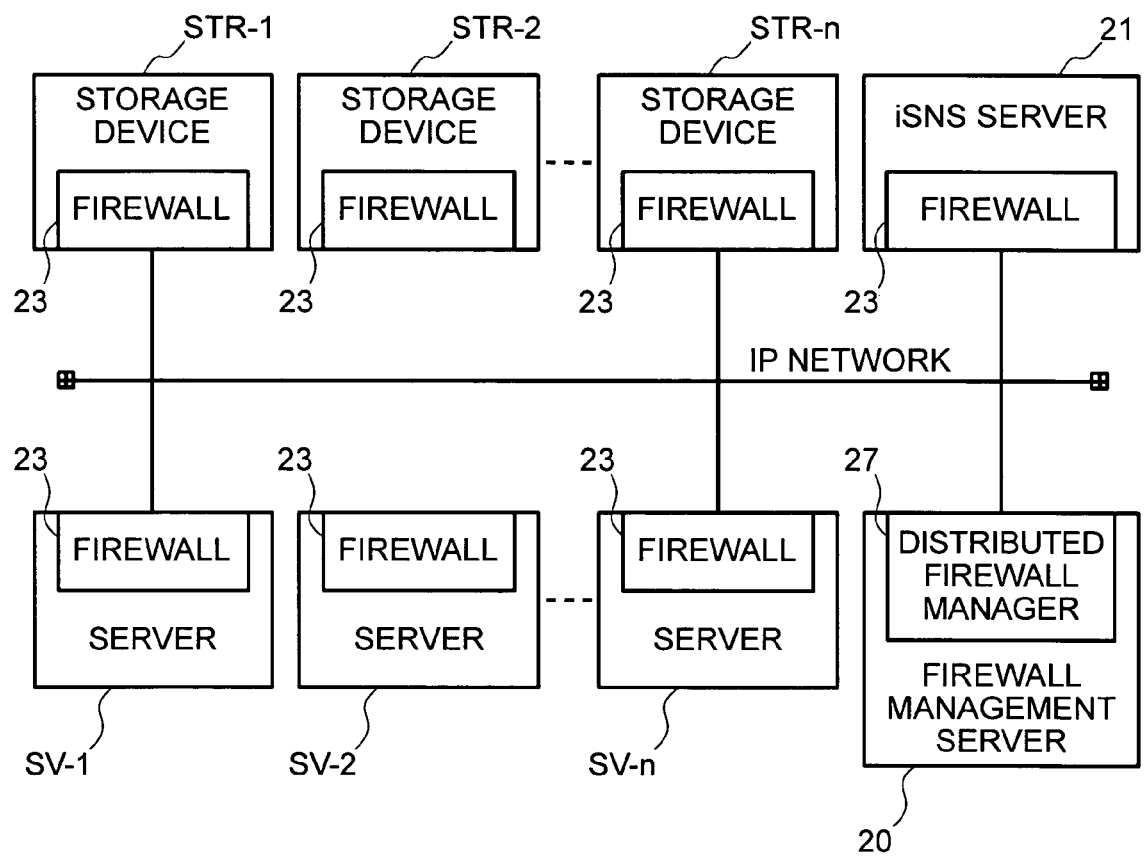
FIG. 2 is a block diagram showing an example of the IP-SAN.

FIG. 2 shows an example of an IP-SAN which is the subject of the present invention. A plurality of servers SV-1 to SV-n, a plurality of storage devices STR-1 to STR-n, an iSNS (Internet Storage Name Server, to be referred to as iSNS server hereinafter) 21, and a firewall management server 20 are connected to an IP network. The firewall management server 20 obtains discovery domain information 29 from the iSNS server 21. Further, a security policy based on discovery domain information 29 is autocreated by a distributed firewall manager 27 of the firewall management server 20, and this security policy is reflected in each of the firewalls 23 disposed in the IP-SAN.

First Embodiment

In connection with this embodiment, an example will be described in which the distributed firewall manager 27 and firewalls 23 of an IP-SAN have an access control function relating to valid users that have been registered in the iSNS server 21 in advance and other users.

Figure 1:
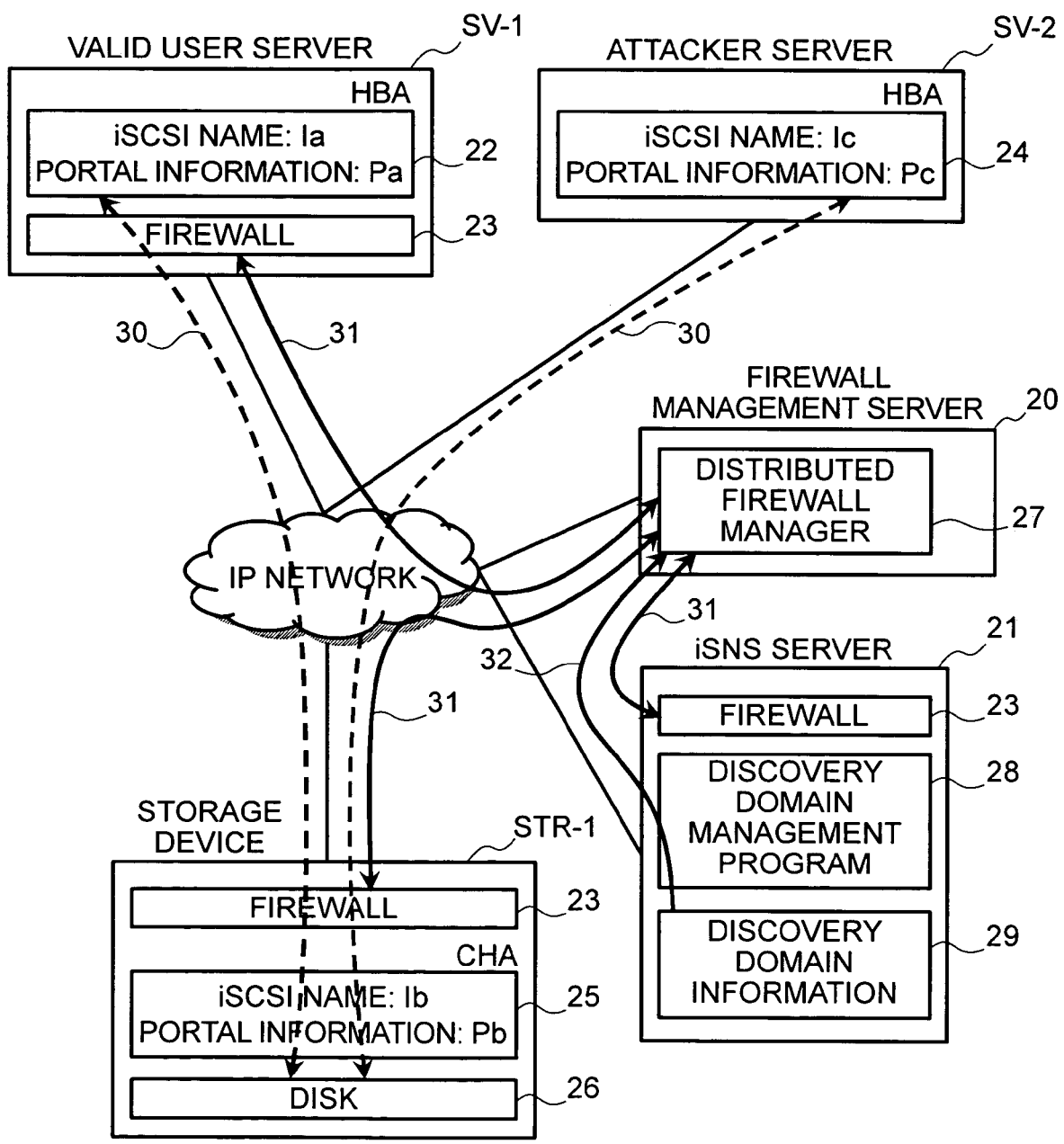
FIG. 1 is a diagram showing the logical configuration of an IP-SAN in accordance with a first embodiment of the present invention.

FIG. 1 is a view showing the logical configuration of an IP-SAN according to the first embodiment. Here, an example constituted by a valid user server SV-1, an attacker server SV-2, a storage device STR-1, a firewall management server 20, and an iSNS server 21 will be described. The valid user server SV-1 is connected to an IP network via an iSCSI-compatible host bus adapter (to be referred to as HBA hereinafter) 22 and a firewall 23, and the attacker server SV-2 is connected to the same network via an HBA 24. A disk 26 of the storage device STR-1 is connected to the same network via an iSCSI-compatible channel adapter (to be referred to as CHA hereinafter) 25 and a firewall 23.

Figure 3:
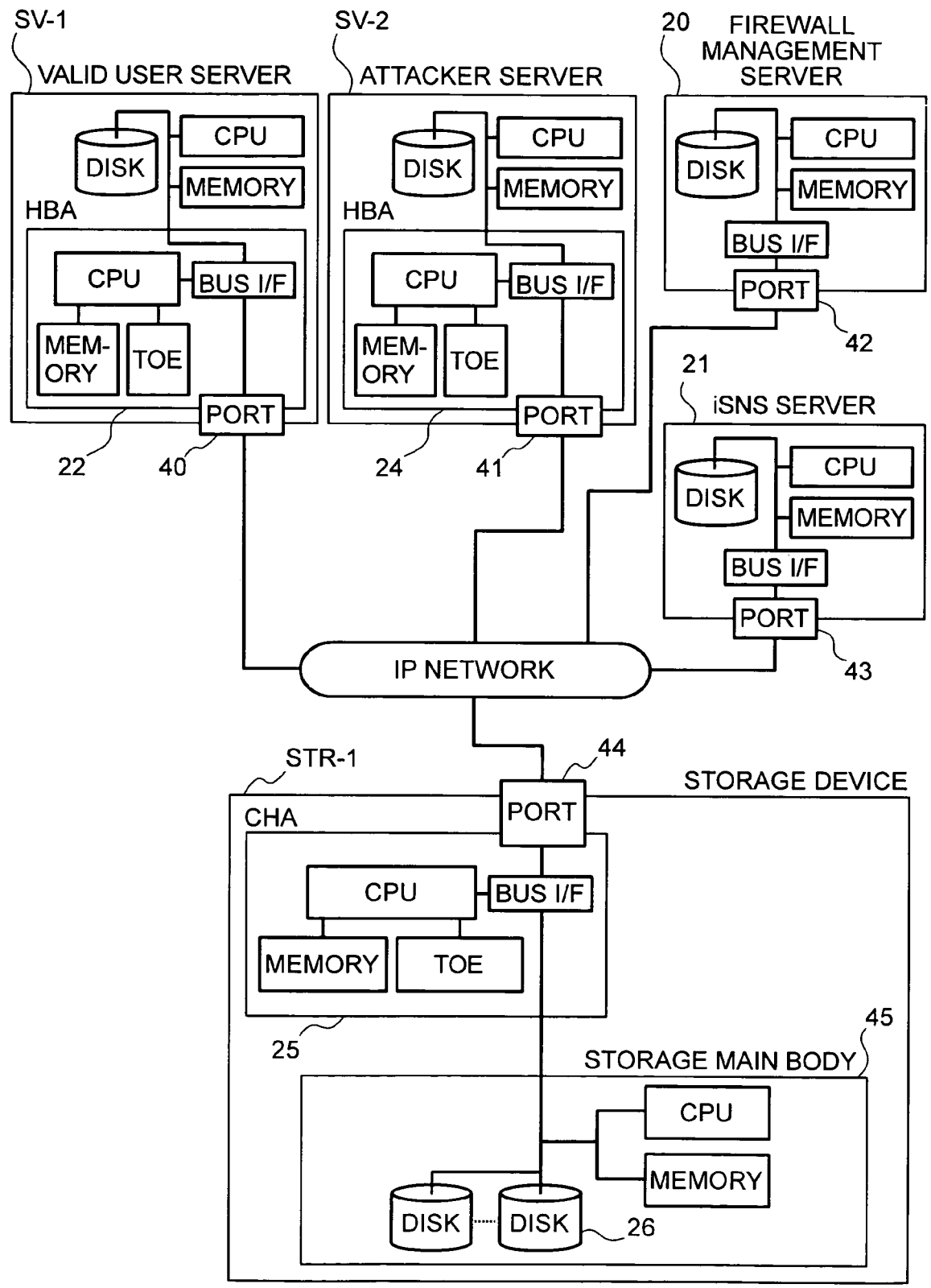
FIG. 3 is a block diagram showing the physical configuration of the IP-SAN in accordance with first and second embodiments of the present invention.

FIG. 3 shows an example of the physical configuration of the first embodiment shown in FIG. 1. The HBAs 22, 24 and the CHA 25 comprise memory which is managed by a CPU, a TCP/IP offload engine (to be referred to as TOE hereinafter), and a bus I/F, and they are connected to the IP network via their respective ports 40, 41, 44. The storage device STR-1 is constituted by the CHA 25 and a storage main body 45, which are connected by a bus I/F.

The firewalls 23 may exist on the disk or in the memory of the valid user server SV-1, firewall management server 20, iSNS server 21, and storage device STR-1, or they may exist in the memory of the HBAs 22, 24 and the CHA 25. The distributed firewall manager 27 exists on the disk or in the memory of the firewall management server 20. A discovery domain management program 28 and discovery domain information 29 exist on the disk or in the memory of the iSNS server 21. An iSCSI name Ia and portal information Pa of the HBA 22, an iSCSI name Ic and portal information Pc of the HBA 24, and an iSCSI name Ib and portal information Pb of the CHA 25 exist in the memory of the HBA 22, the memory of the HBA 24, and the memory of the CHA 25, respectively.

There are no limitations on the location of the distributed firewall manager 27 and each firewall 23. Hence, the physical configuration shown in FIG. 3 is merely an example, and physical configurations in which the distributed firewall manager 27 and firewalls 23 are disposed as follows may be considered.

(1) External attachment as one device within the IP-SAN.
(2) Storage in the memory of an iSCSI adapter (HBA or CHA).
(3) Burning onto the TOE accelerator of an iSCSI adapter (HBA or CHA).
(4) Storage on the disk or in the memory of a device within the IP-SAN in cases when TCP-IP offloading is not performed.

The distributed firewall manager 27 autocreates a common security policy and distributes this security policy to all of the firewalls 23. The firewalls 23 are managed integrally by the distributed firewall manager 27.

Next, the basis for a valid user will be described together with the background of IP-SAN management. As IP-SANs increase in scale, the management costs for iSCSI names rise. Hence, in the network construction process, an administrator registers iSCSI names and portal information in the iSNS server 21 so that each server or storage device may take advantage of a naming service. Here, a set consisting of a single piece or a plurality of pieces of unique information relating to a node (an initiator or a target), typified by an iSCSI name, portal information, and so on, will be referred to as connection source information (access source information). In this embodiment, the term connection source information indicates a pair consisting of an iSCSI name and portal information.

In all cases, connection source information must belong to a discovery domain. Hence, in the naming service of the iSNS server 21, a discovery operation cannot be performed for nodes which are not registered in a discovery domain. Accordingly, it is possible to determine whether connection source information registered in a discovery domain by the administrator is that of a valid user. In this embodiment, a case will be described in which a security policy is autocreated on the basis of connection source information for valid users registered in a discovery domain.

FIG. 4 shows an example of the discovery domain information 29 which has recently been obtained from the iSNS server 21. The discovery domain information 29 is the definition of a connection source (access source) set, a pair consisting of an iSCSI name and portal information being defined for each discovery domain. The result of autocreation of a security policy based on this information is shown in FIG. 5. The distributed firewall manager 27 autocreates a security policy which permits access by connection sources having discovery domain information 29 that is registered in the iSNS server 21, but denies access to connection sources whose discovery domain information 29 is not registered in the iSNS server 21.

Figure 6:
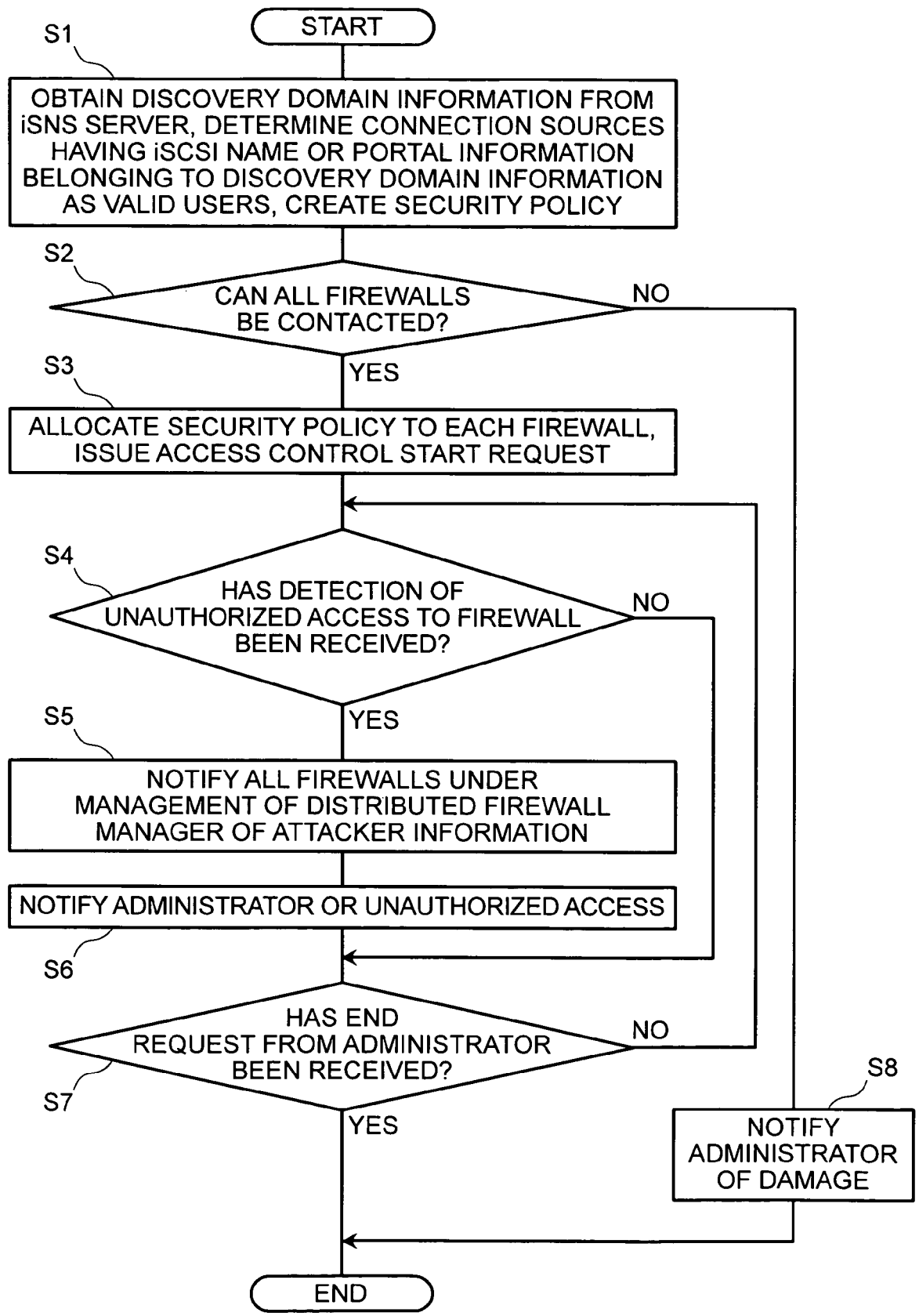
FIG. 6 is a process flow diagram showing the processing of the distributed firewall manager in the first and second embodiments of the present invention.

FIG. 6 shows the processing flow of the distributed firewall manager 27. The distributed firewall manager 27 obtains the discovery domain information 29 from the iSNS server 21, determines connection sources having connection source information which belongs to the discovery domain information 29 to be valid users, and creates the security policy shown in FIG. 5 (step S1).

Next, in order to manage each of the firewalls 23 that are disposed in the IP-SAN integrally, the distributed firewall manager 27 diagnoses the communication condition of the firewalls 23 to determine whether the firewalls 23 can be contacted normally (step S2).

When normal communication has been confirmed, the security policy of FIG. 5 is transmitted to each of the firewalls 23 (security policy allocation), and an access control start request is issued (step S3). If contact cannot be made with the firewalls 23 due to a communication defect, the administrator is notified of the defect (step S8), and the processing is interrupted.

A determination is then made as to whether or not notification of the detection of unauthorized access in the respective locations of the firewalls 23 has been received from the firewalls 23 (step S4), whereupon one or more, or all of the firewalls 23 under the management of the distributed firewall manager 27 are informed of the connection source information of the attacker (step S5).

The administrator is also notified of the unauthorized access (step S6), whereupon processing advances to a step S7. If notification of the detection of unauthorized access is not received from any of the firewalls 23 in the step S4, processing simply advances to the step S7. In the step S7, a determination is made as to whether or not an end request has been received from the administrator, and if an end request has been received, processing is halted. If an end request has not been received, processing is repeated from the step S4.

The various management information that is exchanged between the distributed firewall manager 27 and the firewalls 23 will be referred to simply as management information. FIG. 7 shows an example of this management information. In FIG. 7, the management information that is handled in a second embodiment to be described below is also illustrated. In sequence from the left, the figure illustrates a column showing the notification source which issues the management information, a column showing the notification destination which receives the management information, a column showing the detection content which causes the management information to be issued, and a column showing the notification items which form the content of the management information to be transmitted to the notification destination.

The management information classification included in the notification items is an indicator for classifying the management information type, and it may include unauthorized access, communication failure, failure to obtain discovery domain information, and so on. For example, when a connection request from unauthorized connection source information is detected in the distributed firewall 27, the administrator is informed of a management information classification indicating unauthorized access, information regarding the source of the unauthorized connection, the object of the attack (initiator or target information), the number of times an attack has been repeated from the same connection source information, and (in the second embodiment) the firewall ID of the firewall 23 that is under attack. Here, the object of the attack, the number of recurrent attacks, and the firewall ID of the firewall 23 under attack indicate a damaged condition.

Figure 8:
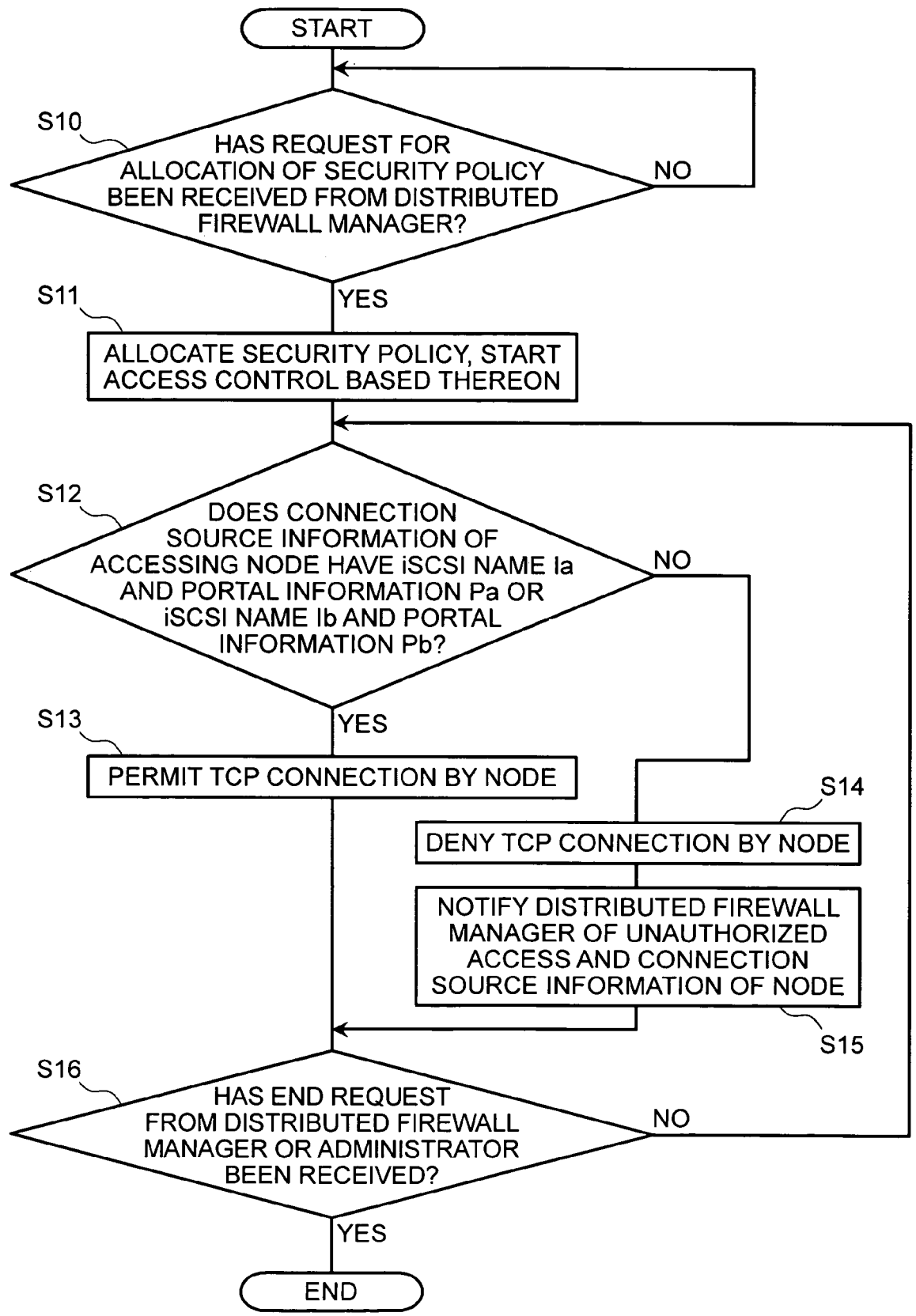
FIG. 8 is a process flow diagram showing the processing of each firewall in the first and second embodiments of the present invention.

FIG. 8 shows the processing flow of each of the firewalls 23 managed by the distributed firewall manager 27. A standby condition continues until a request for security policy allocation is received from the distributed firewall manager 27 (step S10).

Once the request is received, the security policy shown in FIG. 5 is allocated in reality, after which access control based thereon begins (step S11).

The logical communication path between the initiator and target of an IP-SAN is realized by an iSCSI session according to the iSCSI protocol. An iSCSI session is established when the initiator establishes a TCP connection with the target and authentication is performed between the initiator and target.

When one of the nodes attempts to access the firewall 23 during access control, the firewall 23 refers to the allocated security policy; and, when the connection source information of the accessing node has the iSCSI name la and the portal information Pa or the iSCSI name Ib and the portal information Pb, the firewall 23 permits a TCP connection from the node. Conversely, when the connection source information does not correspond to that described above, the access is considered as an attack by an attacker, and, hence, a TCP connection is denied (steps S12, S13, S14).

When a TCP connection is denied, the distributed firewall manager 27 is informed of the connection source information of the attacker and also of the fact that unauthorized access has occurred (step S15). This is a function for sharing the result of an unauthorized access detected by one of the firewalls 23 with one or more of the firewalls 23 to prevent secondary damage. The firewall 23 repeats the processing from the step S12 until an end request is received from the distributed firewall manager 27 or the administrator.

Next, the various functions of the distributed firewall manager 27 and the firewalls 23 will be described. First, when a correction request is received from the administrator in relation to an autocreated security policy, the distributed firewall manager 27 is capable of correcting the security policy. Here, correction indicates correction by the administrator of an autocreated, access-permitting security policy to an access-denying security policy, or conversely, correction by the administrator of an autocreated, access-denying security policy to an access-permitting security policy, and so on. Such correction can also be envisaged in cases where access is denied temporarily to a valid user for maintenance purposes, access permission is granted in advance to a node which is confirmed as being registered as a valid user but is not yet registered in a discovery domain, and so on.

Further, to avoid an attack by an attacker manipulating of the information sharing function, or, in other words, a Denial of Service attack or Distributed Denial of Service attack caused by performing unauthorized attacks on one or a plurality of servers continuously to intentionally increase the number of notifications to the distributed firewall manager 27, the distributed firewall manager 27 integrates the information-sharing notifications to each of the firewalls 23 into a single notification when the connection source information included in the unauthorized access notifications is the same, and, as a result, notifications are not transmitted in duplicate.

Further, since the discovery domain information 29 is updated according to the state of the network, which may vary at any time during operation as a result of additions to or modifications of the network equipment, the distributed firewall manager 27 is also capable of updating the security policy on the basis of the latest discovery domain information 29 either periodically or in accordance with an instruction from the administrator. As an example of a trigger for updating the security policy, when the firewalls 23 detect an SCN (State Change Notification) packet, it is determined that an addition to or modification of the network equipment has been made, and the distributed firewall manager 27 is informed thereof. The distributed firewall manager 27 then obtains the discovery domain information 29 from the iSNS server 21, and it autocreates a security policy permitting access only for the connection source information that is registered in the obtained discovery domain information 29, denying access for any other connection source information, thus updating the current security policy.

Further, an initial setting in which access is denied to all of the nodes by default may be implemented in each of the firewalls 23 disposed in the IP-SAN. This is effective as a function to prevent possible attacks by an attacker prior to allocation of the initial security policy by the distributed firewall manager 27.

The distributed firewall manager 27 is provided with a similar access control function to that of the firewalls 23 disposed within the IP-SAN, as well as its function as a manager. The reason for this is that, since the security risks distributed within the IP-SAN are aggregated by the distributed firewall manager 27, the security of the distributed firewall management server 20 itself must be protected.

Further, when the distributed firewall manager 27 distributes a security policy to the firewalls 23, a similar security policy to that of the firewalls 23 is also set for the access control function within the distributed firewall manager 27.

A plurality of the distributed firewall managers 27 may be disposed in accordance with the scale and form of the network. When such a function is employed, for example, information generated by aggregating the management information of each segment that is managed by each distributed firewall manager 27 may be managed integrally by a manager of the distributed firewall managers, and thus the load that is placed on the network by management notification can be lightened. Further, a third layer access control function, such as an IP address or port number, is provided between the manager of the distributed firewall managers and the respective distributed firewall managers 27.

Further, when a transmission/reception packet issued during communication between the distributed firewall manager 27 and the firewalls 23, or between the distributed firewall manager 27 and the iSNS server 21, is intercepted by an attacker, the position (IP address, port number, and so on) of the firewall management server 20 may be traced easily. Since this leads to the provision of information for narrowing the attack path, it is desirable that the position of the firewall management server 20 be made difficult to specify. When the distributed firewall manager 27 communicates with another node, originator information (IP address, port number, and so on) attached to the header information of a request packet (management packet) may be spoofed as virtual originator information set in advance for the distributed firewall manager 27 and transmitted in a unicast or multicast format. In this case, the relationship of the virtual originator information between the distributed firewall manager 27 and the firewalls 23 must be stored in advance. A response packet from the firewalls 23 to the distributed firewall manager 27 may also be transmitted as a spoofed packet in a broadcast format, similar to the request packet. Upon reception of a packet addressed to the virtual originator information, the distributed firewall manager 27 must determine whether the packet is addressed to itself. The means described above do not necessarily have to be employed to prevent interception by an attacker, and means such as encryption of transmission/reception packets may be employed instead.

The distributed firewall manager 27 and the firewalls 23 are also capable of performing access control on outward-bound traffic from within the access control function provided therein as well as on inward-bound traffic from outside of the access control function. This is due to the danger of information leakage to an attacker in cases such as when spyware is installed within the access control function of the distributed firewall manager 27 or firewalls 23 by some means. In so doing, when an attempt is made to transmit traffic to a user other than a valid user who has been verified by the autocreated security policy, this transmission is blocked by the access control function.

According to the first embodiment described above, the effects listed below can be obtained.
(1) When the iSNS is penetrated by spoofing (when the iSNS server is unable to detect unauthorized access), infiltration by an attacker can be prevented on the storage side.
(2) Infiltration by an attacker who connects directly to the storage device can be prevented.
(3) By performing access control in a prior phase to TCP connection to a target, Denial of Service attacks, Distributed Denial of Service attacks, and so on can be prevented.
(4) The firewalls may be disposed at any locations within the IP-SAN, and, hence, cumulative damage caused by a single security hole in the naming service information, other valid user information, and so on can be prevented.

Second Embodiment

A feature of the naming service in the iSNS server 21 is that a discovery operation can only be executed in relation to a node that is within a discovery domain to which the connection source information thereof belongs. Hence, when allocating connection source information to a discovery domain, the administrator usually registers the connection source information while considering the security boundaries. In this embodiment, an example of the distributed firewall manager 27 and firewalls 23 of an IP-SAN having a function of controlling the access of the valid users registered in the iSNS server 21 in advance between discovery domains will be described.

Figure 9:
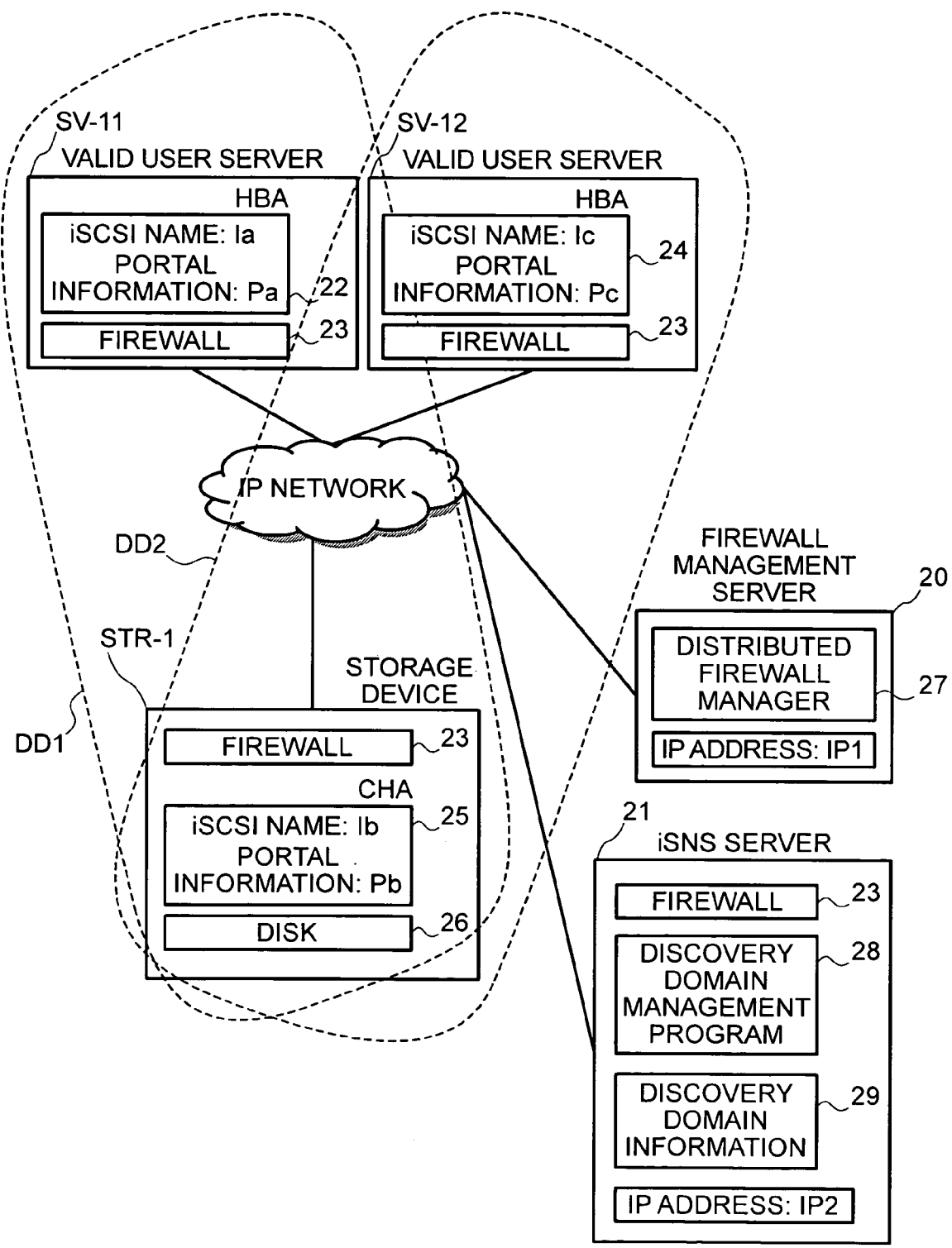
FIG. 9 is a diagram showing the logical configuration of an IP-SAN in accordance with the second embodiment of the present invention.

An example of the logical configuration of the second embodiment is shown in FIG. 9. Valid user servers SV-11, SV-12 are connected to the firewall management server 20, iSNS server 21, and storage device STR-1 via an IP network. The connection source information pairs Ia, Pa and Ib, Pb belong to a discovery domain DD1, and the connection source information pairs Ib, Pb and Ic, Pc belong to a discovery domain DD2. In connection with this embodiment, access control between discovery domains will be described, and it is assumed that connection requests from users other than valid users can be denied in a similar fashion to the first embodiment.

The physical configuration of the second embodiment is similar to the physical configuration of the first embodiment (FIG. 3), the valid user servers SV-11, SV-12 in FIG. 9 corresponding to the valid user server SV-1 and attacker server SV-2 in FIG. 2. The relationship between the logical configuration and physical configuration is also similar to that of the first embodiment.

The distributed firewall manager 27 autocreates a security policy for each of the firewall IDs (see FIG. 11) that are allocated individually to each of the firewalls 23, and it distributes the security policies thereto. The firewalls 23 are managed integrally by the distributed firewall manager 27.

Figure 10:
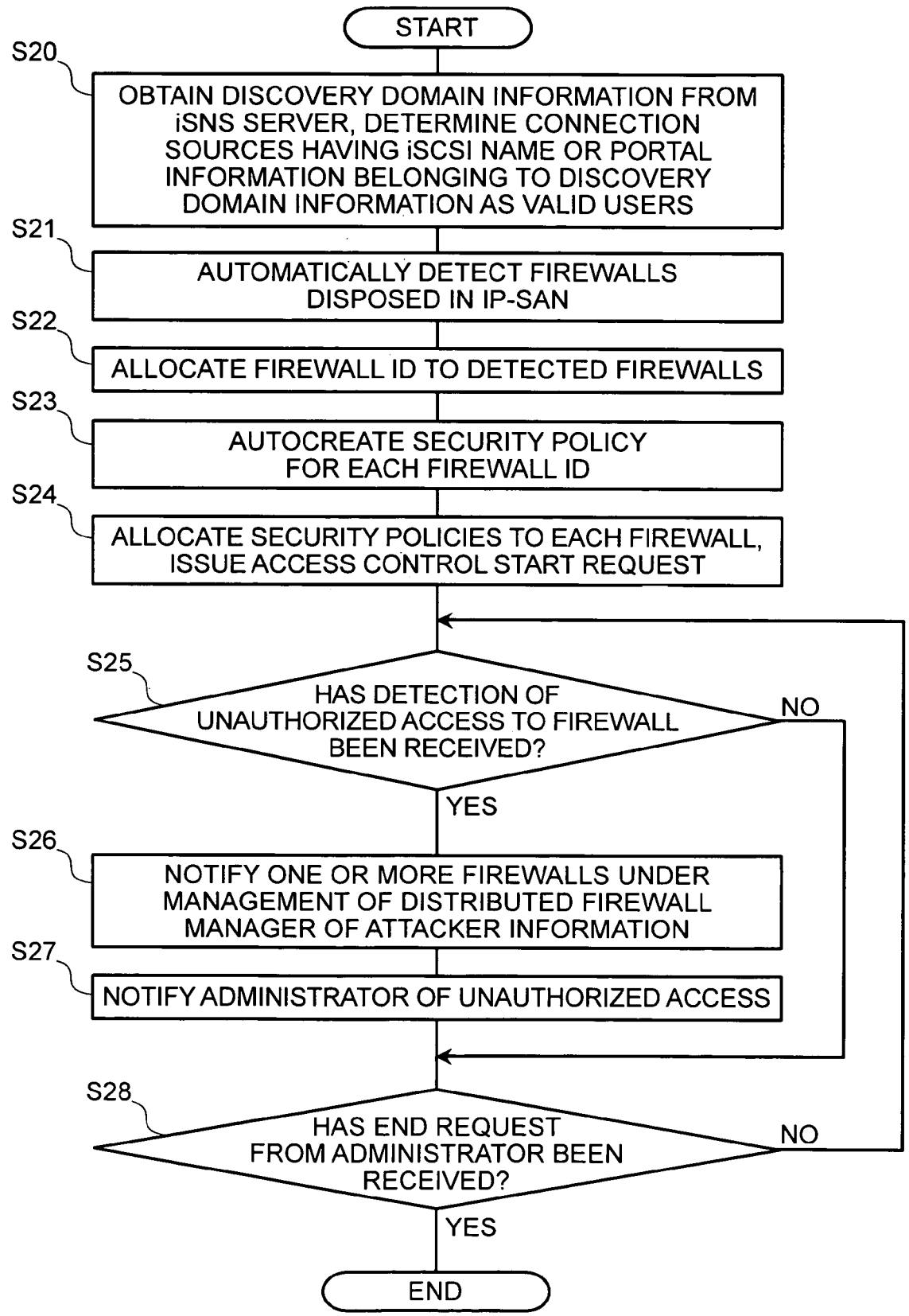
FIG. 10 is a process flow diagram showing the processing flow of the distributed firewall manager in the second embodiment of the present invention.

FIG. 10 shows the processing flow of the distributed firewall manager 27 in the second embodiment. The distributed firewall manager 27 obtains the discovery domain information 29 from the iSNS server 21, and it determines connection sources having connection source information that belongs thereto to be valid user nodes (step S20).

Next, the distributed firewall manager 27 automatically detects each of the firewalls 23 that are disposed in the IP-SAN in order to manage the firewalls 23 integrally (step S21). Automatic detection is implemented by broadcasting a management packet within the IP-SAN such that the firewalls 23 that receive the packet transmit a response packet to the distributed firewall manager 27.

Next, firewall IDs are assigned automatically to the firewalls 23 which detect the management packet (step S22). The firewall ID is an identifier for identifying each of the plurality of firewalls 23 disposed in the IP-SAN individually. Next, as shown in FIG. 11, the distributed firewall manager 27 autocreates a security policy for each firewall ID.

The processing flow of the firewalls 23 in the second embodiment is identical to the processing flow of FIG. 8 in the first embodiment.

In FIG. 11, a firewall ID (FW-ID1) is allocated to the firewall 23 of the valid user server SV-11, a firewall ID (FW-ID2) is allocated to the firewall 23 of the valid user server SV-12, a firewall ID (FW-ID3) is allocated to the distributed firewall manager 27 of the firewall management server 20, a firewall ID (FW-ID4) is allocated to the firewall 23 of the iSNS server 21, and a firewall ID (FW-ID5) is allocated to the firewall 23 of the storage device STR-1.

Further, an IP address IP1 is allocated to the firewall management server 20 as unique information, and an IP address IP2 is allocated to the iSNS server 21 as unique information. The IP addresses IP1, IP2 in the second embodiment are merely one example of unique information possessed by the network equipment, and other forms of unique information, such as a MAC (Media Access Control) address or a host name, may also be considered as unique information.

Next, taking the valid user server SV-11 as an example, an example of an autocreated security policy will be described. The valid user server SV-11 has the firewall ID (FW-ID1) and, hence, belongs to the discovery domain DD1. The valid user server SV-11 is thus allocated a security policy which denies all access apart from access by a set consisting of Ia, Pa, and FW-ID1, access by a set consisting of Ib, Pb, and FW-ID5, access by a set consisting of IP1 and FW-ID3, and access by a set consisting of IP2 and FW-ID4.

Referring back to FIG. 10, security policy allocation to the firewalls 23 is performed, whereupon an access control start request is issued (step S24).

Next, a determination is made as to whether or not notification of the detection of unauthorized access in the respective locations of the firewalls 23 has been received by one or a plurality of the firewalls 23 (step S25); and, if notification of the detection of unauthorized access has been received, one or more of the firewalls 23 under the management of the distributed firewall manager 27 is informed of the connection source information of the attacker (step S26). The administrator is also informed of the unauthorized access (step S27), whereupon the processing advances to a step S28.

If none of the firewalls 23 detects an unauthorized access, processing simply advances from the step S25 to the step S28. In the step S28, a determination is made as to whether or not an end request has been received from the administrator, and, if an end request has been received, processing is halted. If an end request has not been received, processing is repeated from the step S25.

According to the second embodiment, as described above, the following effect may be obtained in addition to the effects (1) through (4) of the first embodiment.

(5) Determinations as to whether an access source is valid or not can be performed using a combination of unique information, such as an iSCSI name, portal information, and MAC address allocated directly to the access source device, and a firewall ID, which is an identifier allocated by the distributed firewall manager to identify each firewall individually; and, hence, even upon access by an attacker in which all of the iSCSI name, portal information, MAC address, and so on have been spoofed, the access can be denied as unauthorized access. Further, the firewall ID may be transmitted in the options region of a packet, or firewall ID negotiation may be performed among the firewalls such that access permission is granted only in the case of a verifiable firewall ID. In the latter case, all access from devices that are not installed with a firewall can be denied, regardless of whether the access source information has been spoofed or not.

What is claimed is:

1. A security system in a storage area network using an Internet Protocol (IP) in which a plurality of both servers and storage devices are connected to Internet via each of a plurality of firewalls provided within each of the servers and storage devices, comprising a manager for managing each of said firewalls, wherein said manager creates a security policy based on access source set definitions defined by each of combinations of an Internet Small Computer System Interface (iSCSI) name and portal information having been assigned to each of servers and storage devices and distributes said security policy to each of said firewalls, the access source set definitions being arranged to be stored in an Internet Storage Name Server (iSNS) connected to the manager, wherein each of said firewalls refers to the distributed security policy to perform access control for distinguishing a valid access complying with the security policy from an unauthorized access breaching the security policy with a judgment on whether or not an access to each of the servers and the storage devices complies with the security policy, by prohibiting an establishment of TOP - connection, wherein when said manager receives notification from said firewall of a detection of access from an unauthorized access source sending an access which does not comply with the security policy and information regarding the unauthorized access source as unauthorized access information, said manager informs said firewall of said unauthorized access source information, and wherein said manager refers to said access source set definitions periodically according to an update interval defined in advance by an administrator, and updates said security policy when said definitions have been updated, or refers to said access source set definitions upon reception of notification issued by a function for managing said access source set definitions indicating that the network has been updated, and updates said security policy in accordance with the update content thereof, or refers to said access source set definitions upon reception of notification issued by a network device indicating reconstruction of the network, and updates said security policy in accordance with the modification content thereof.

2. A security system in a storage area network using an Internet Protocol (IP) in which a plurality of both servers and storage devices are connected to Internet via each of a plurality of firewalls provided within each of the servers and storage devices, comprising a manager for managing each of said firewalls, wherein said manager creates a security policy based on access source set definitions defined by each of combinations of an Internet Small Computer System Interface (iSCSI) name and portal information having been assigned to each of servers and storage devices and distributes said security policy to each of said firewalls, the access source set definitions being arranged to be stored in an Internet Storage Name Server (iSNS) connected to the manager, wherein each of said firewalls refers to the distributed security policy to perform access control for distinguishing a valid access complying with the security policy from an unauthorized access breaching the security policy with a judgment on whether or not an access to each of the servers and the storage devices complies with the security policy, by prohibiting an establishment of TCP - connection, wherein, when said manager receives notification from said firewall of a detection of access from an unauthorized access source sending an access which does not comply with the security policy and information regarding the unauthorized access source as unauthorized access information, said manager informs said firewall of said unauthorized access source information, and wherein, when notifications of unauthorized access source information are transmitted to said firewall regarding the same unauthorized access, said manager aggregates said notifications into one notification.

3. A security system in a storage area network using an Internet Protocol (IP) in which a plurality of both servers and storage devices are connected to Internet via each of a plurality of firewalls provided within each of the servers and storage devices, comprising a manager for managing each of said firewalls, wherein said manager creates a security policy based on access source set definitions defined by each of combinations of an Internet Small Computer System Interface (iSCSI) name and portal information having been assigned to each of servers and storage devices and distributes said security policy to each of said firewalls, the access source set definitions being arranged to be stored in an Internet Storage Name Server (iSNS) connected to the manager, wherein each of said firewalls refers to the distributed security policy to perform access control for distinguishing a valid access complying with the security policy from an and unauthorized access breaching the security policy with a judgment on whether or not an access to each of the servers and the storage devices complies with the security policy, by prohibiting an establishment of TCP - connection, wherein when said manager receives notification from said firewall of a detection of access from an unauthorized access source sending an access which does not comply with the security policy and information regarding the unauthorized access source as unauthorized access information, said manager informs said firewall of said unauthorized access source information, and wherein said manager spoofs originator information attached to a management packet issued by said manager into virtual originator information, a relationship of said virtual originator information between said manager and said firewall being stored in advance, such that during communication from said manager to said firewall, the management packet having said virtual originator information attached is transmitted in a unicast or multicast format, and during communication from said firewall to said manager, said virtual originator information is broadcast as destination information.

4. A security system in a storage area network using an Internet Protocol (IP) in which a plurality of both servers and storage devices are connected to Internet via each of a plurality of firewalls provided within each of the servers and storage devices, comprising a manager for managing each of said firewalls, wherein said manager creates a security policy based on access source set definitions defined by each of combinations of an Internet Small Computer System Interface (iSCSI) name and portal information having been assigned to each of servers and storage devices and distributes said security policy to each of said firewalls, the access source set definitions being arranged to be stored in an Internet Storage Name Server (iSNS) connected to the manager, wherein each of said firewalls refers to the distributed security policy to perform access control for distinguishing a valid access complying with the security policy from an unauthorized access breaching the security policy with a judgment on whether or not an access to each of the servers and the storage devices complies with the security policy, by prohibiting an establishment of TCP-connection, wherein when said manager receives notification from said firewall of a detection of access from an unauthorized access source sending an access which does not comply with the security policy and information regarding the unauthorized access source as unauthorized access information, said manager informs said firewall of said unauthorized access source information, and wherein management of said access source set definitions is performed by managing set definitions constituted only by access sources determined by an administrator to be valid access sources, updating said definitions according to a request from said manager, and providing notification of the latest definitions periodically according to a notification interval defined in advance by the administrator, or providing notification of the latest definitions in accordance with a notification request from the administrator.

5. A security system in a storage area network using an Internet Protocol (IP), provided with a plurality of storage devices connected to an IP network via a firewall provided with each of the plurality of storage devices, each of the storage devices having an Internet Small Computer System Interface (iSCSI) name and portal information, and a plurality of servers connected to the IP network via a firewall provided within each of the plurality of servers, each of the servers having an iSCSI name and portal information said security system comprising one or more managers for managing said firewalls integrally, wherein said manager autocreates a security policy based on one or more access source set definitions and distributes said security policy to said firewalls, wherein each of the access source set definitions are defined in accordance with an iSCSI name and portal information assigned to each of the plurality of servers and the plurality of storage devices, the access source set definitions being arranged to be stored in an Internet Storage Name Server (iSNS) connected to the manager, wherein said firewalls perform access control to distinguish valid access sources complying with the security policy from unauthorized access sources breaching the security policy, or access control to distinguish an access source set for a valid access source, by prohibiting an establishment of TCP-connection, wherein when access from an unauthorized access source or access from a different access source set to the access source sets to which said firewalls or said manager belongs is detected, information sharing is performed by having said firewalls notify said manager of access source information, access destination information, and a damage condition as main unauthorized access information indicating a source from which the unauthorized access was transmitted, and by having said manager notify said one or more firewalls of the unauthorized access source information, and wherein said manager stores a list of said firewalls defined in advance by the administrator, or creates a list of said firewalls by detecting said firewalls periodically according to an interval defined in advance by said administrator or by detecting said firewalls upon an instruction from said administrator, and manages said firewalls by allocating a unique identifier to each firewall such that when notification of unauthorized access is received from said firewalls, said manager informs said one or more firewalls of information regarding the source of the unauthorized access.

6. A security system in a storage area network using an Internet Protocol (IP), provided with a plurality of storage devices connected to an IP network via a firewall provided with each of the plurality of storage devices, each of the storage devices having an Internet Small Computer System Interface (iSCSI) name and portal information, and a plurality of servers connected to the IP network via a firewall provided within each of the plurality of servers, each of the servers having an iSCSI name and portal information said security system comprising one or more managers for managing said firewalls integrally, wherein said manager autocreates a security policy based on one or more access source set definitions and distributes said security policy to said firewalls, wherein each of the access source set definitions are defined in accordance with an iSCSI name and portal information assigned to each of the plurality of servers and the plurality of storage devices, the access source set definitions being arranged,to be stored in an Internet Storage Name Server (iSNS) connected to the manager, wherein said firewalls perform access control to distinguish valid access sources complying with the security policy from unauthorized access sources breaching the security policy, or access control to distinguish an access source set for a valid access source, by prohibiting an establishment of TCP-connection, wherein when access from an unauthorized access source or access from a different access source set to the access source sets to which said firewalls or said manager belongs is detected, information sharing is performed by having said firewalls notify said manager of access source information, access destination information, and a damage condition as main unauthorized access information indicating a source from which the unauthorized access was transmitted, and by having said manager notify said one or more firewalls of the unauthorized access source information, and wherein said firewalls perform said access control upon reception of an identifier and security policy allocated by said manager, and when unauthorized access is detected, said firewalls notify said manager of information regarding the source of the unauthorized access.

7. A security system in a storage area network using an Internet Protocol (IP), comprising:

a plurality of devices respectively including:

a firewall for performing data processing connected with each other via an internet, each of the devices having access source set definitions respectively including both an Internet Small Computer System Interface (iSCSI) name and portal information;

an iSNS server for storing the access source set definitions; and a manager device connected to both the Internet Storage Name Server (iSNS) server and each of the devices via the internet for creating a security policy based on the access source set definitions, and for distributing the security policy to each of the firewalls provided within each of the plurality of devices, wherein each of the firewalls refers to the security policy for distinguishing a valid access complying with the security policy from an unauthorized access breaching the security policy by prohibiting an establishment of TOP-connection, and sends notification of a detection of access from an unauthorized access to the manager, and wherein the manager sends information on a source of the unauthorized access to the plurality of devices when the manager receives the notification.

8. A manager device adapted to be positioned in a system including:

a plurality of devices respectively including a firewall for performing data processing connected with each other via an internet, each of the devices having access source set definitions respectively including both an Internet Small Computer System Interface (iSCSI) name and portal information; and an Internet Storage Name Server (iSNS) server for storing the access source set definitions, wherein the manager device is connected to both the iSNS server and each of the devices via the internet for creating a security policy based on the access source set definitions, and for distributing the security policy to each of the firewalls provided within each of the plurality of devices, wherein each of the firewalls refers to the security policy for distinguishing a valid access complying with the security policy from an unauthorized access breaching the security policy prohibiting an establishment of TCP-connection, and sends a notification of a detection of access from an unauthorized access to the manager, and wherein the manager sends information on a source of the unauthorized access to the plurality of devices when the manager receives the notification.

9. A security management method comprising the steps of:

creating, at a manager device, a security policy based on access source set definitions, each of the access source set definitions respectively being assigned to each of a plurality of devices respectively including a firewall for performing data processing connected with each other via an internet, said access source set definitions being stored in an Internet Storage Name Server (iSNS);

judging, at each of the plurality of devices, whether or not an authorized access breaching the security policy from a source is detected in accordance with the security policy;

notifying the unauthorized access of the manager device in case that an unauthorized access is detected; and sending, at the manager device, information on the source of the unauthorized access to the plurality of devices when the manager receives the notification.

* * * * *